S. D. SPRONG & W. E. McCOY.
CONDUIT FOR HIGH POTENTIAL CONDUCTORS.
APPLICATION FILED OCT. 16, 1911.
1,043,165.
Patented Nov. 5, 1912.
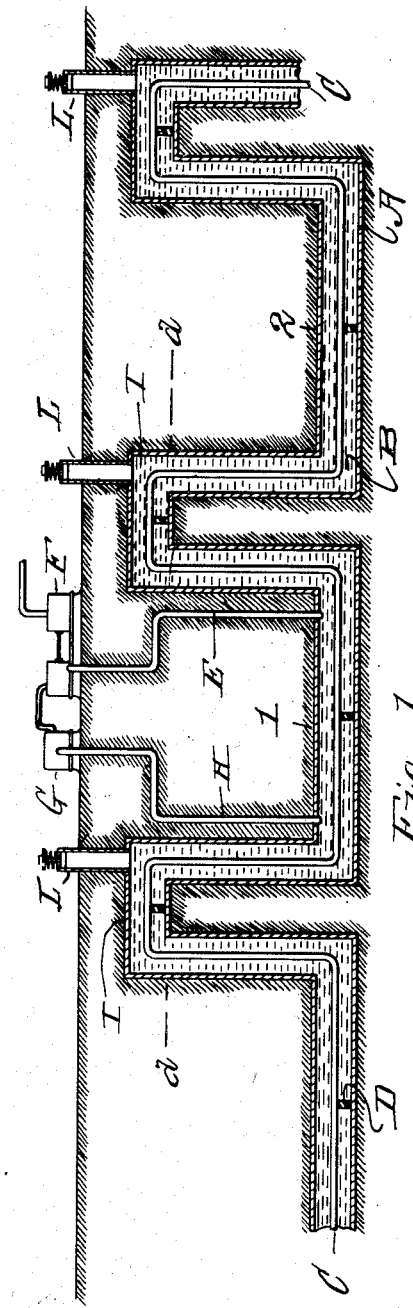
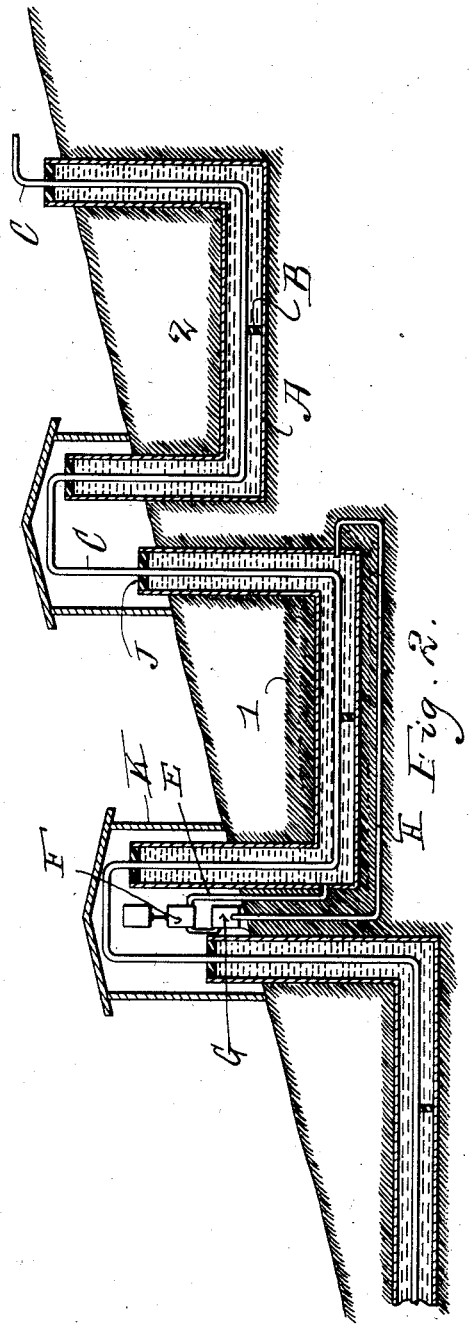

UNITED STATES PATENT OFFICE

SEVERN D. SPRONG AND WALTER E. McCOY, OF NEW YORK, N. Y., ASSIGNORS OF ONE-THIRD TO FRANK W. SMITH, OF NEW YORK, N. Y.

CONDUIT FOR HIGH-POTENTIAL CONDUCTORS.

1,043,165.  Specification of Letters Patent.  Patented Nov. 5, 1912.

Application filed October 16, 1911. Serial No. 654,908.

*To all whom it may concern:*

Be it known that we, SEVERN D. SPRONG and WALTER E. McCOY, citizens of the United States, residing at New York, in the county of New York and State of New York, have invented a certain new and useful Improvement in Conduits for High-Potential Conductors, of which the following is a specification.

The invention relates to a conduit for line conductors carrying high potential currents, in which the said conductors are immersed in a liquid dielectric, which is continuously circulated through the conduit, and through a dehydrator, whereby any moisture in the liquid is removed. A conduit especially devised for this purpose is set forth in our application Serial No. 654,906, and the aforesaid means for freeing the dielectric in the conduit from moisture is set forth in our application Serial No. 654,907, both of said applications being simultaneously filed herewith. In our last-named application, we have described a conduit divided into compartments by transverse partitions, through which compartments the line conductor, or conductors, extend. Each compartment is filled with liquid dielectric, which is kept in circulation and passed through a dehydrator by suitable pumping means. The object of dividing the conduit into separate compartments is to limit the effect of leakage to the compartment in which the leak occurs, and thus prevent emptying of the entire conduit.

Our present invention consists in the construction of the conduit, hereinafter set forth, whereby leakage, as before, is confined to a particular portion of the conduit, but in which the compartments are formed without transverse partitions and by converting the whole conduit into a series of liquid receptacles or traps.

In the accompanying drawing—Figure 1 is a vertical section of our conduit in which the liquid traps are shown connected. Fig. 2 is a similar section in which the traps are disconnected.

Similar letters and numbers of reference indicate like parts.

In Fig. 1, the conduit A is a metal pipe, containing a suitable insulating lining, as fully described in our application Serial No. 654,906, aforesaid. Said pipe is bent to form a succession of traps or receptacles, as 1, 2, and is filled with liquid dielectric B, such as oil. A line conductor C extends through the conduit and rests on suitable insulating supports D, preferably of porcelain or the like. The conduit A is preferably placed underground. Each receptacle or trap, as 1, has connected to it a pipe E leading to a pump which forces the liquid to a dehydrator G, whereby any contained moisture is removed and thence by pipe H back to the trap. It will be obvious that leakage from any one trap, as 1, will be confined to that trap and to the portions I of the conduit A, whereby it is connected to the next adjacent traps. In said portions air check valves L are placed, so as to prevent siphoning. The liquid level in said adjacent traps, therefore, cannot fall below the line $a, a$.

In the modified form of our conduit shown in Fig. 2, which is especially suited for use on hill-sides, the traps, as 1, 2, are disconnected, and their upper open ends may be closed, if desired, by covers J of insulating material. The line conductor C extends through the air from trap to trap. The ends of the adjacent traps, pumps and dehydrators, may be protected by suitable casings, as shown at K.

Any suitable form of dehydrator may be used, such as that in which the liquid dielectric is passed through paper, felt, or the like, which absorbs the water, or in which the water is removed by chemical means; or the water may be expelled by evaporation, assisted, if desired, by heating.

We claim:

1. A tubular conduit for containing liquid dielectric, comprising a series of traps, a line conductor immersed in said dielectric and extending through said traps, means for causing in each of said traps a circulation of dielectric around said conductor, and means combined with each trap for dehydrating the dielectric circulating therein.

2. A tubular conduit for containing liquid dielectric, comprising a series of disconnected traps, a line conductor immersed in said dielectric and extending through said traps and across the intervals between said traps, means for causing in each of said 5 traps a circulation of dielectric around said conductor, and means combined with each trap for dehydrating the dielectric circulating therein.

In testimony whereof we have affixed our signatures in presence of two witnesses.

SEVERN D. SPRONG.
WALTER E. McCOY.

Witnesses:
GERTRUDE T. PORTER,
MAY T. McGARRY.